(12) United States Patent
Yu et al.

(10) Patent No.: US 9,285,652 B2
(45) Date of Patent: Mar. 15, 2016

(54) POINT-WISE PHASE MATCHING FOR NONLINEAR FREQUENCY GENERATION IN DIELECTRIC RESONATORS

(71) Applicants: Nan Yu, Arcadia, CA (US); Dmitry V. Strekalov, Arcadia, CA (US); Guoping Lin, Pasadena, CA (US)

(72) Inventors: Nan Yu, Arcadia, CA (US); Dmitry V. Strekalov, Arcadia, CA (US); Guoping Lin, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 13/924,401

(22) Filed: Jun. 21, 2013

(65) Prior Publication Data

US 2015/0002921 A1    Jan. 1, 2015

Related U.S. Application Data

(60) Provisional application No. 61/662,747, filed on Jun. 21, 2012.

(51) Int. Cl.
| | |
|---|---|
| *G02F 1/37* | (2006.01) |
| *G02F 1/35* | (2006.01) |
| *G02F 1/355* | (2006.01) |
| *G02B 27/56* | (2006.01) |
| *G02B 5/04* | (2006.01) |

(52) U.S. Cl.
CPC ............... *G02F 1/37* (2013.01); *G02F 1/3501* (2013.01); *G02F 1/3544* (2013.01); *G02B 5/04* (2013.01); *G02B 27/56* (2013.01); *G02F 1/3551* (2013.01); *G02F 2001/3509* (2013.01)

(58) Field of Classification Search
CPC ....... G02F 1/37; G02F 1/3501; G02F 1/3544; G02F 1/3551; G02F 2001/3509; G02B 27/56
See application file for complete search history.

(56) References Cited

U.S. PATENT DOCUMENTS

| | | | | |
|---|---|---|---|---|
| 3,201,709 | A * | 8/1965 | Boyd | 330/4.5 |
| 4,992,763 | A * | 2/1991 | Bert | H01P 7/10 |
| | | | | 333/219 |
| 5,444,571 | A * | 8/1995 | Debuisschert et al. | 359/566 |
| 5,684,815 | A * | 11/1997 | Miura et al. | 372/40 |
| 7,043,117 | B2 * | 5/2006 | Matsko et al. | 385/28 |
| 7,092,591 | B2 * | 8/2006 | Savchenkov et al. | 385/15 |
| 7,630,417 | B1 * | 12/2009 | Maleki et al. | 385/15 |
| 8,164,816 | B1 * | 4/2012 | Savchenkov et al. | 359/245 |
| 8,831,056 | B2 * | 9/2014 | Savchenkov et al. | 372/32 |

* cited by examiner

*Primary Examiner* — Daniel Petkovsek
(74) *Attorney, Agent, or Firm* — Milstein Zhang & Wu LLC; Joseph B. Milstein

(57) ABSTRACT

An optical resonator fabricated from a uniaxial birefringent crystal, such as beta barium borate. The crystal is cut with the optical axis not perpendicular to a face of the cut crystal. In some cases the optical axis lies in the plane of the cut crystal face. An incident (input) electromagnetic signal (which can range from the infrared through the visible to the ultraviolet) is applied to the resonator. An output signal is recovered which has a frequency that is an integer multiple of the frequency of the input signal. In some cases a prism is used to evanescently couple the input and the output signals to the resonator.

20 Claims, 16 Drawing Sheets

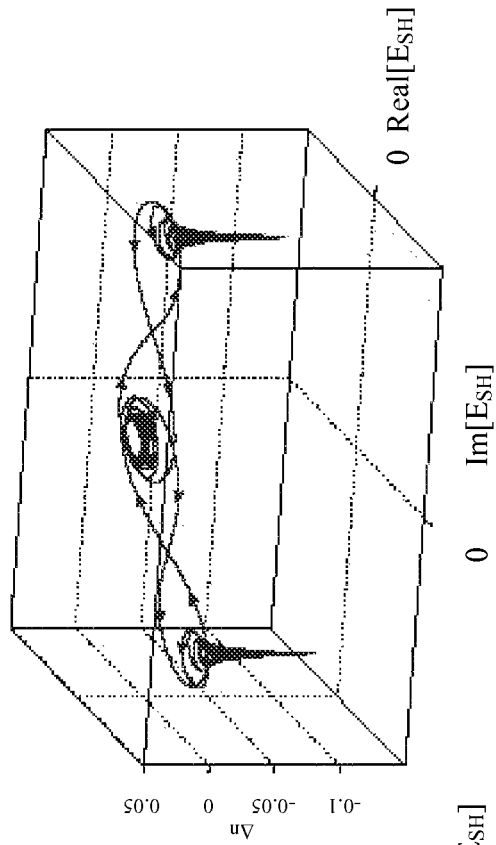
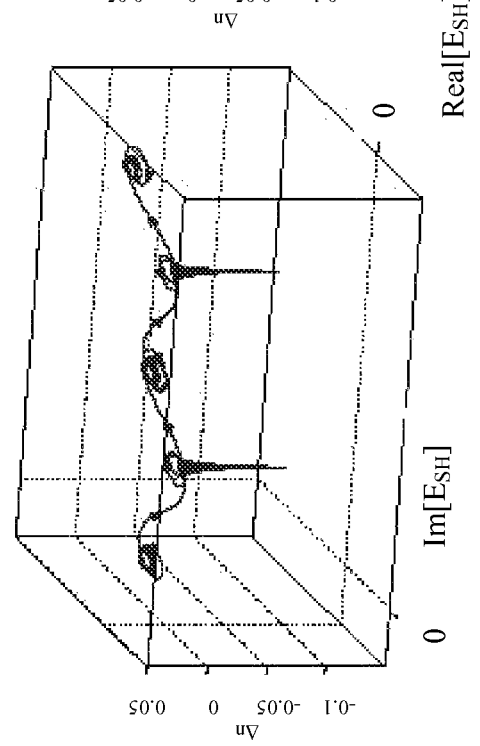
FIG. 4D
FIG. 4C

POINT-WISE PHASE MATCHING FOR NONLINEAR FREQUENCY GENERATION IN DIELECTRIC RESONATORS

CROSS-REFERENCE TO RELATED APPLICATIONS

This application claims priority to and the benefit of co-pending U.S. provisional patent application Ser. No. 61/662,747 filed Jun. 21, 2012, which application is incorporated herein by reference in its entirety.

STATEMENT REGARDING FEDERALLY FUNDED RESEARCH OR DEVELOPMENT

The invention described herein was made in the performance of work under a NASA contract, and is subject to the provisions of Public Law 96-517 (35 USC 202) in which the Contractor has elected to retain title.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

FIELD OF THE INVENTION

The invention relates to optical resonators in general and particularly to optical resonators that provide second harmonic generation capability.

BACKGROUND OF THE INVENTION

Frequency conversion through nonlinear optical processes has been ubiquitously used to generate laser light at spectral regions from UV to far infrared where direct laser light is not available. Ever since the first SHG by Franken et al. in 1961, it is recognized that an efficient frequency conversion depends critically on both phase matching and pump light intensity. Until now, birefringent PM and quasi-phase matching (QPM) are two main techniques successfully used. The former relies on incidental PM between the pump and the harmonics having different polarizations. The latter typically requires artificial patterning of the optical nonlinearity of the material. The most commonly used patterning method is periodic poling which unfortunately excludes most nonlinear crystals. Recent research efforts have explored various PM conditions such as modal dispersion, form birefringence and random PM.

Optical whispering gallery mode (WGM) resonators made of crystalline materials are capable of ultra-high quality (Q) factors and confine light in small mode volumes. See for example V. S. Ilchenko, A. B. Matsko, and L. Maleki, "Kilohertz optical resonances in dielectric crystal cavities," Phys. Rev. A 70, 051804 (2004). These features have drawn strong interest in nonlinear optics applications. See for example, A. A. Savchenkov, A. B. Matsko, V. S. Ilchenko, I. Solomatine, D. Seidel, and L. Maleki, "Tunable optical frequency comb with a crystalline whispering gallery mode resonator," Phys. Rev. Lett. 101, 93902 (2008); V. S. Ilchenko, A. A. Savchenkov, A. B. Matsko and L. Maleki, "Nonlinear optics and crystalline whispering gallery mode cavities," Phys. Rev. Lett. 92, 43903 (2004); and J. U. Furst, D. V. Strekalov, D. Elser, M. Lassen, U. L. Andersen, C. Marquardt and G. Leuchs, "Naturally phase-matched second-harmonic generation in a whispering-gallery-mode resonator," Phys. Rev. Lett. 104, 153901 (2010).

For facile phase matching of these nonlinear processes, birefringent crystals are used. The resonator symmetry axis is commonly chosen to coincide with the crystal optic axis, which are referred to as hence z-cut resonators. Natural phase matching condition can be achieved in the z-cut crystals with a narrow wavelength range. Periodic poling in WGM resonators of ferroelectric crystals has also been studied for quasi phase matching. Most of commonly used ferroelectric crystals are not suited at UV wavelength due to their larger optical absorption. Beta barium borate (BBO) is an important nonlinear crystal used in visible and UV wavelength range. It is a uniaxial crystal with a large birefringence and wide transparency range from 198 to 2100 nm.

The growth of beta barium borate has been reported in the literature and methods of growth of BBO crystals have been patented. See for example, Gualtieri et al., U.S. Pat. No. 4,931,133, issued Jun. 5, 1990, which is said to disclose a method of growing optical quality $\beta$-$BaB_2O_4$ crystals that involves growing these crystals from a fluxed melt of $BaB_2O_4$, $Na_2O$ and NaCl, in certain proportions.

Optical frequency conversion processes in nonlinear materials are limited by the accessible phase matching conditions and require high pump powers.

There is a need for systems and methods that provide convenient phase matching and second harmonic generation over a wide range of wavelengths.

SUMMARY OF THE INVENTION

According to one aspect, the invention features an optical resonator. The optical resonator comprises a birefringent crystal having an optical axis, the birefringent crystal cut so that the optical axis is disposed at an angle different from 0 degrees relative to a direction perpendicular to a cut face of the birefringent crystal, the birefringent crystal having a circular circumference defined about the cut face so as to provide a whispering gallery mode of optical propagation in the birefringent crystal, the birefringent crystal configured to receive an input electromagnetic signal having a first frequency $f_1$ and configured to provide in response to the input electromagnetic signal an output electromagnetic signal having a second frequency $f_2$, the first frequency and the second frequency being related according to the relation $f_2 = N \times f_1$ where N is an integer greater than 1.

In one embodiment, the birefringent crystal is beta barium borate.

In another embodiment, the optical axis is disposed at an angle of 90 degrees relative to a direction perpendicular to a cut face of the birefringent crystal.

In yet another embodiment, the input electromagnetic signal is a TE mode electromagnetic signal.

In still another embodiment, the output electromagnetic signal is a TM mode electromagnetic signal.

In one more embodiment, the integer N=2.

In a further embodiment, the input electromagnetic signal is an infrared signal.

In yet a further embodiment, the input electromagnetic signal is a visible signal.

In an additional embodiment, the input electromagnetic signal is an ultraviolet signal.

In still a further embodiment, the optical resonator further comprises a structure evanescently coupled to the birefringent crystal, the structure configured to couple the input electromagnetic signal into the birefringent crystal, and the structure configured to couple the output electromagnetic signal out of the birefringent crystal.

In one embodiment, the structure evanescently coupled to the birefringent crystal is a prism.

According to another aspect, the invention relates to a method of generating a harmonic of an electromagnetic signal. The method comprises the steps of providing a birefringent crystal having an optical axis, the birefringent crystal cut so that the optical axis is disposed at an angle different from 0 degrees relative to a direction perpendicular to a cut face of the birefringent crystal, the birefringent crystal having a circular circumference defined about the cut face so as to provide a whispering gallery mode of optical propagation in the birefringent crystal; applying an input electromagnetic signal having a first frequency $f_1$ to the birefringent crystal; and recovering from the birefringent crystal an output electromagnetic signal having a second frequency $f_2$, the first frequency and the second frequency being related according to the relation $f_2 = N \times f_1$ where N is an integer greater than 1.

In one embodiment, the optical axis is disposed at an angle of 90 degrees relative to a direction perpendicular to a cut face of the birefringent crystal.

In another embodiment, the input electromagnetic signal is a TE mode electromagnetic signal.

In yet another embodiment, the output electromagnetic signal is a TM mode electromagnetic signal.

In still another embodiment, the integer N=2.

In a further embodiment, the input electromagnetic signal is an infrared signal.

In yet a further embodiment, the input electromagnetic signal is a visible signal.

In an additional embodiment, the input electromagnetic signal is an ultraviolet signal.

In one more embodiment, at least one of the input electromagnetic signal and the output electromagnetic signal is evanescently coupled to the birefringent crystal by way of a prism.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 4C is a three dimensional plot of the harmonic field gain in the complex plane, plotted against the refractive index mismatch between fundamental and harmonic field for constructive interference.

FIG. 4D is a three dimensional plot of the harmonic field gain in the complex plane, plotted against the refractive index mismatch between fundamental and harmonic field for destructive interference.

DETAILED DESCRIPTION

We have investigated UV whispering gallery mode (WGM) resonators of non z-cut beta barium borate. The quality factor of $1\times10^8$ has been demonstrated at 370 nm. We have demonstrated a WGM resonator made from highly birefringent crystalline BBO that generated second harmonic for pump wavelengths between 634 nm and 1557 nm. WGM polarization properties in these resonators are described.

This work describes the use of non z-cut (i.e. angle-cut) crystalline disc resonators and their applications in nonlinear frequency generation. We describe the fabrication of BBO WGM resonators and the first demonstration of high Q factor at UV. We will also describe some of interesting polarization properties in WGMs of the strongly birefringent material.

To fabricate a BBO resonator, we first identify the crystal optic axis of the crystal substrate by sending a visible light through it and detecting the incident angle where the birefringence disappears. The substrate is then cut into discs. These discs are then polished until a high Q is obtained. We have fabricated a number of BBO WGM resonators with 33±3°, 57±3°, and 90° angles between the crystal optical axis and the disc normal.

Figure 1A:
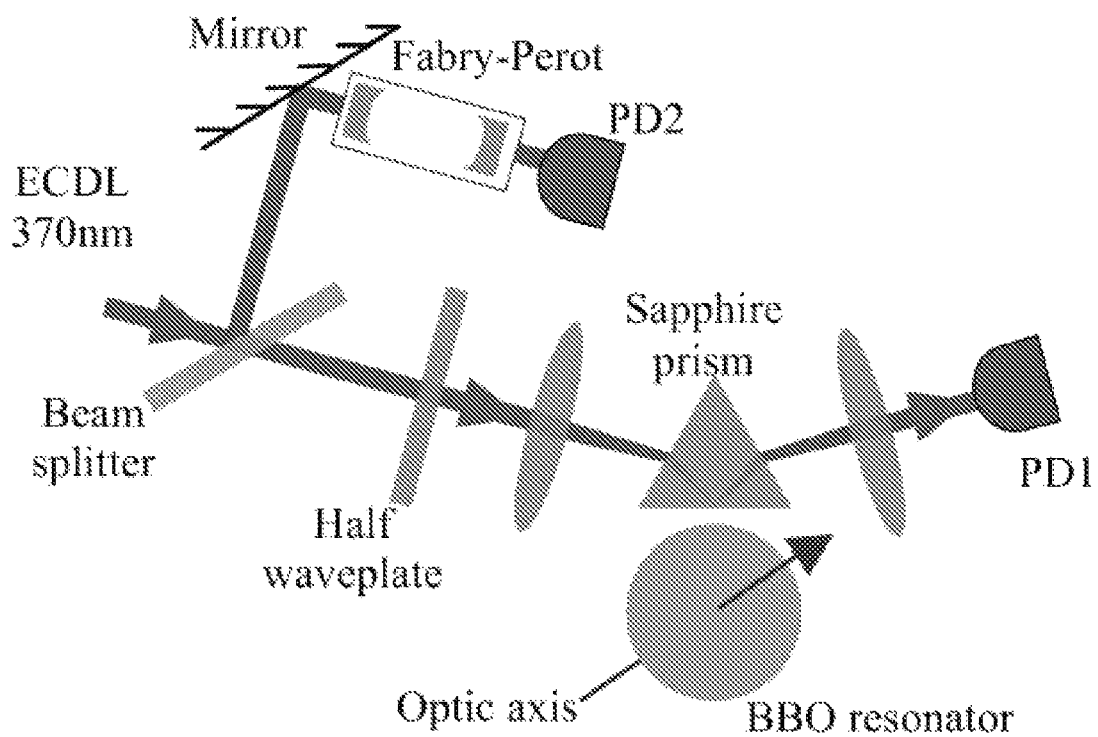
FIG. 1A is a schematic diagram of the apparatus used to demonstrate nonlinear frequency generation in birefringent crystals.

An apparatus used to demonstrate the use of non-z-cut birefringent crystals for producing second harmonic generation is shown in FIG. 1A. In one embodiment, a laser source is an external cavity based diode laser operating at 370 nm. The laser is then split into two beams. One of the two beams goes to a Fabry-Perot interferometer for use as a frequency reference. The other beam is sent to a sapphire coupling prism in free space.

Figure 1B:
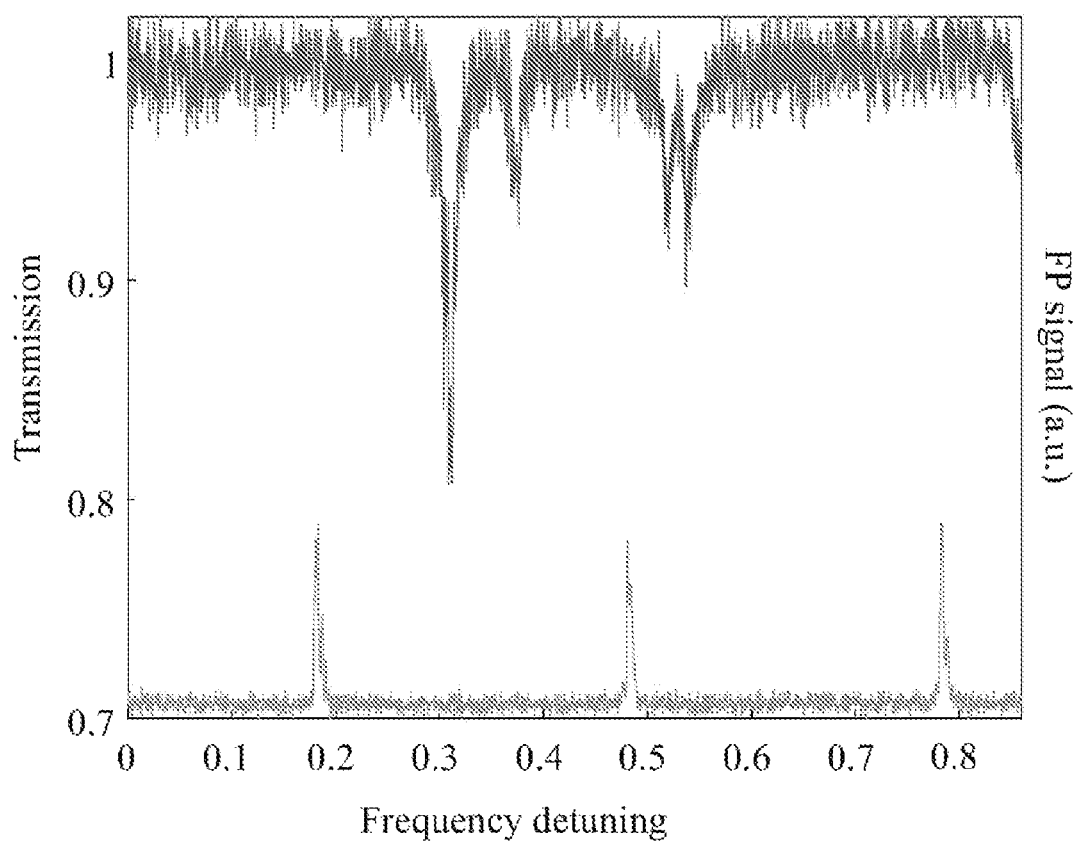
FIG. 1B is a high Q whispering gallery mode (WGM) resonance spectrum of BBO at 370 nm.

We have obtained Q factors by measuring the resonator mode linewidth $\delta f$, given by $Q=f\,\delta f$. FIG. 1B shows an example of the resonance mode spectrum at 370 nm as the laser frequency is scanned. It is obtained from the 33° cut disc with diameter of about 2.7 mm. A Lorentzian fit gives a linewidth of 8 MHz, corresponding to a Q of $1\times10^8$. The doublet structure shown in FIG. 1B results from surface Rayleigh scattering that couples two counter-propagating modes optical modes that circulate at the edge of the resonator. This phenomenon is often observed in high Q WGM resonators. To understand the limiting factor of the measured Q at 370 nm, we measured the Q factors at 980 nm and 1560 nm. As listed in Table 1, we found that the wavelength dependence of the measured Qs does not scale with the Rayleigh scattering loss. We therefore can assume the maximum quality factor is given by $Q_{max}=2\pi n_0/(\lambda\alpha)$, where $n_0$ is refractive index and $\alpha$ is the absorption coefficient. From this we obtain new upper bounds of the absorption coefficients in BBO crystals as shown in Table 1. Compared with the absorption coefficient of BBO in literature, such as 0.01 cm$^{-1}$ at 532 nm (see for example, D. N. Nikogosyan, "Beta Barium Borate (BBO)," Phys. Rev. A 52, 359-368 (1991)), we believe our indirect absorption measurements provide one order of magnitude better bound for the BBO at the measured wavelengths.

Figure 1C:
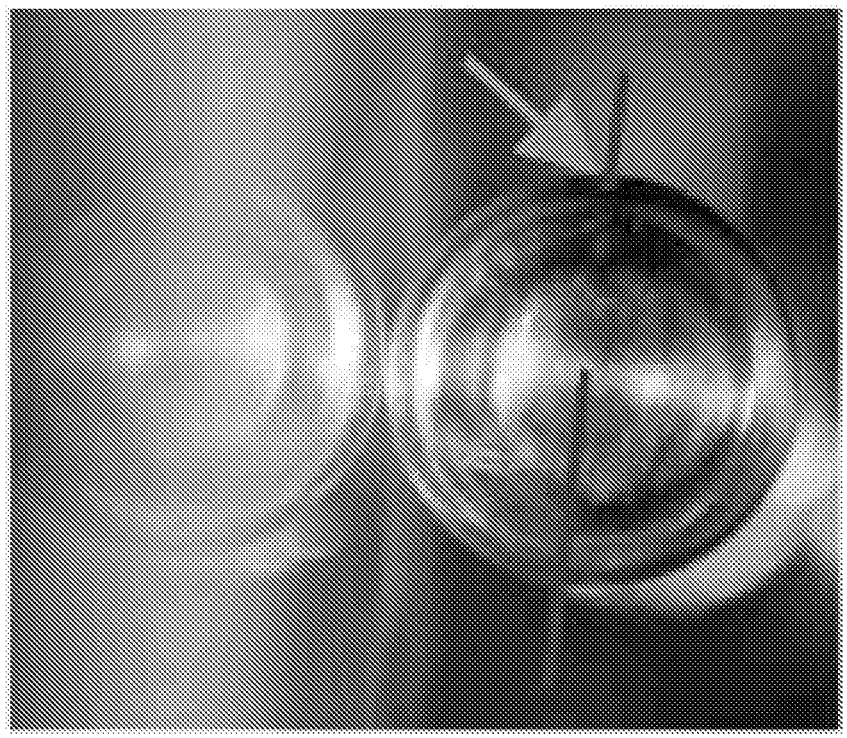
FIG. 1C is an image of a BBO resonator.

FIG. 1C is an image of the resonator where the black mark behind the crystal disc shows the projection of the crystal axis.

TABLE 1

Upper bounds of absorption coefficients of BBO calculated from WGMs linewidths

| Wavelength (nm) | Linewidth (MHz) | Q factor | Absorption coefficient (cm$^{-1}$) |
|---|---|---|---|
| 370 | 5.6 | $1.5\times10^8$ | $1.9\times10^{-3}$ |
| 980 | 0.8 | $3.8\times10^8$ | $2.8\times10^{-4}$ |
| 1560 | 0.26 | $7.4\times10^8$ | $9.0\times10^{-5}$ |

Figure 2A:
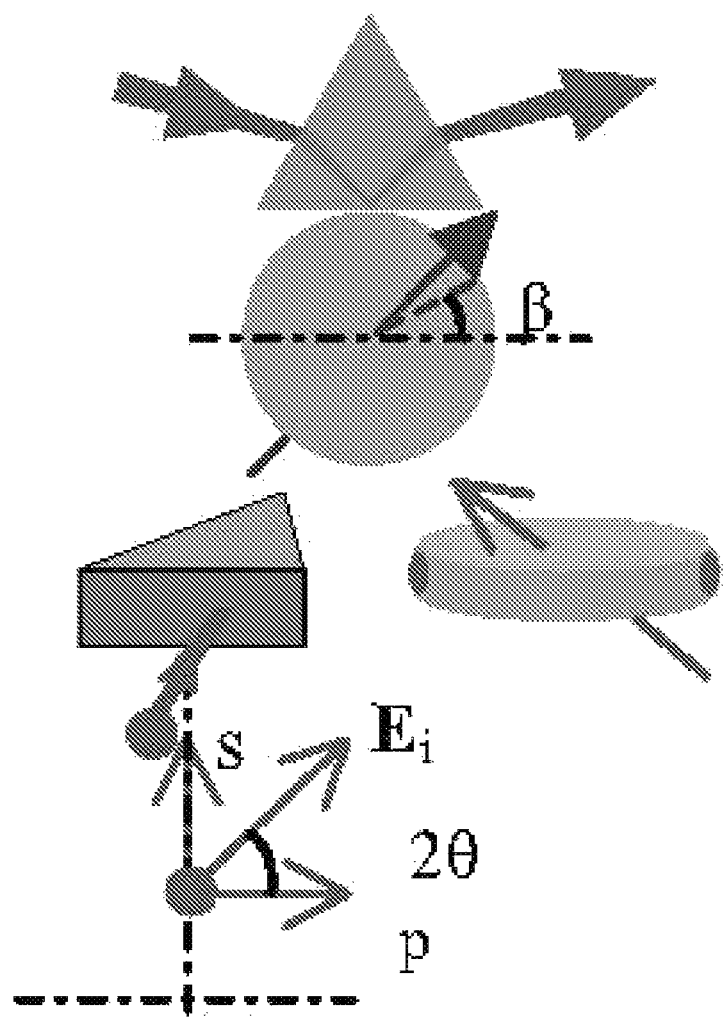
FIG. 2A is a diagram that illustrates the input beam polarization orientation $2\theta$ and the relative resonator position $\beta$.

The strong birefringence of the BBO crystal results in some interesting polarization properties of the WGMs. We found one kind of WGM with its polarization orientation varying along the periphery of the disc. We measured the free spectral ranges (FSR) of these modes at 1560 nm and found an average index of 1.65±0.01 in both angle-cut crystals of different angles. This value is close to the ordinary index of BBO crystal. We believe that high Q whispering gallery modes exist as a result of both total internal reflection and so-called inhibited reflection in the strongly birefringent crystal. This means that light rays in the WGM resonators circulate along the circumference of a disc only as the ordinary ray. FIG. 2A is a diagram that illustrates the input beam polarization orientation $2\theta$ and the relative resonator position $\beta$. It gives an example of the mode excitation structures with varying polarization of the input beam. The resonator relative position $\beta$ is about 90°. One can see the WGM polarization is neither TM nor TE at this position.

Figures 2B, 2C:
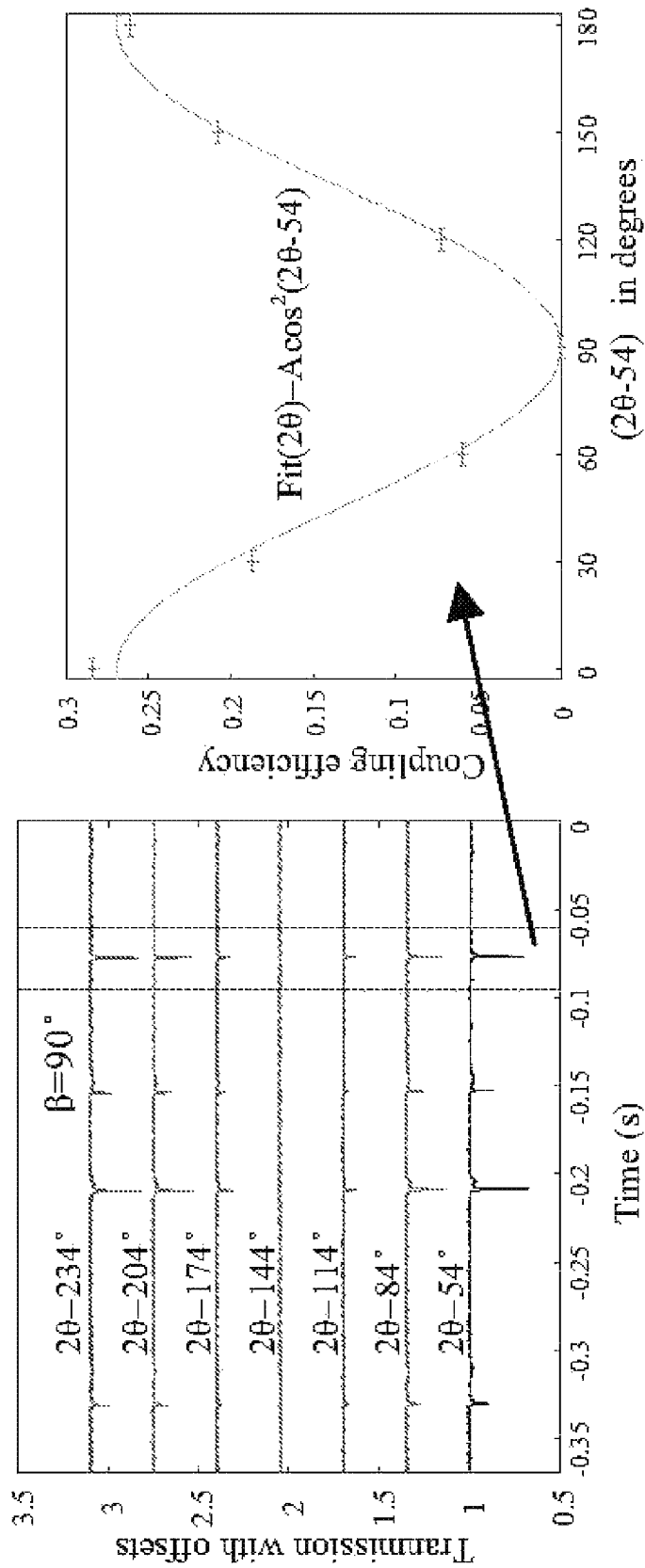
FIG. 2B is a graph that shows a number of transmission spectra with offsets for different input polarizations $2\theta$.
FIG. 2C is a graph that illustrates the behavior of the excitation efficiency as a function of polarization orientation relative to maximum excitation.

FIG. 2B is a graph that shows a number of transmission spectra with offsets for different input polarizations $2\theta$.

FIG. 2C is a graph that illustrates the behavior of the excitation efficiency as a function of polarization orientation relative to maximum excitation.

We now discuss a broadband phase matching (PM) technique in high quality factor (Q) whispering gallery mode (WGM) resonators made of birefringent crystalline materials. This technique relies on discrete PM regions established between a constant phase velocity of one mode and an oscillating phase velocity of another around the circumference of the resonator induced by the geometry of the crystalline optic axis parallel to the resonator plane. We have demonstrated efficient second harmonic generation (SHG) for a wide wavelength range from 780 nm at near infrared to 317 nm in ultraviolet (UV) in a single beta barium borate (BBO) resonator of such crystal cut geometry. The observed SHG conversion efficiency is on the order of 5% (mW)$^{-1}$. This broadband PM technique opens a new way for nonlinear optics applications in WGM resonators. To the best of our knowledge, this is the first reported continuous wave UV SHG generation in a WGM resonator.

The high pump intensities needed for efficient conversion are typically achieved through temporally confined pulsed lasers, spatially confined light in waveguide, or continuous wave (cw) laser power enhancement in a resonant cavities. The latter two strategies can be employed in WGM resonators as WGM resonators are capable of supporting high-Q modes and small mode volumes by continuous total internal reflections in a circular dielectric material (a thin disk in our case). Modal dispersion PM, non-critical PM and periodically poled QPM have been explored in nonlinear WGM resonators typically made from LiNbO$_3$. Likewise, all PM methods have very limited wavelength bandwidth and the ferroelectric crystal materials are not suitable for UV applications.

Motivated by exploring new PM schemes and diverse nonlinear UV crystals, we investigated WGM resonators made of uniaxial BBO crystal with their optic axis tilted instead of parallel to the resonator symmetry axis. A non z-cut resonator geometry results in a significant variation of the refractive index along its disk circumference which allows PM. This is akin to reported QPM methods in AlGaAs and GaAs micro resonators. However, we have found that only resonator disks with the optic axis parallel to the plane of the disk (or "xy-cut") support two orthogonally polarized modes. This is the resonator geometry that we now describe.

Figures 3A, 3B, 3C:
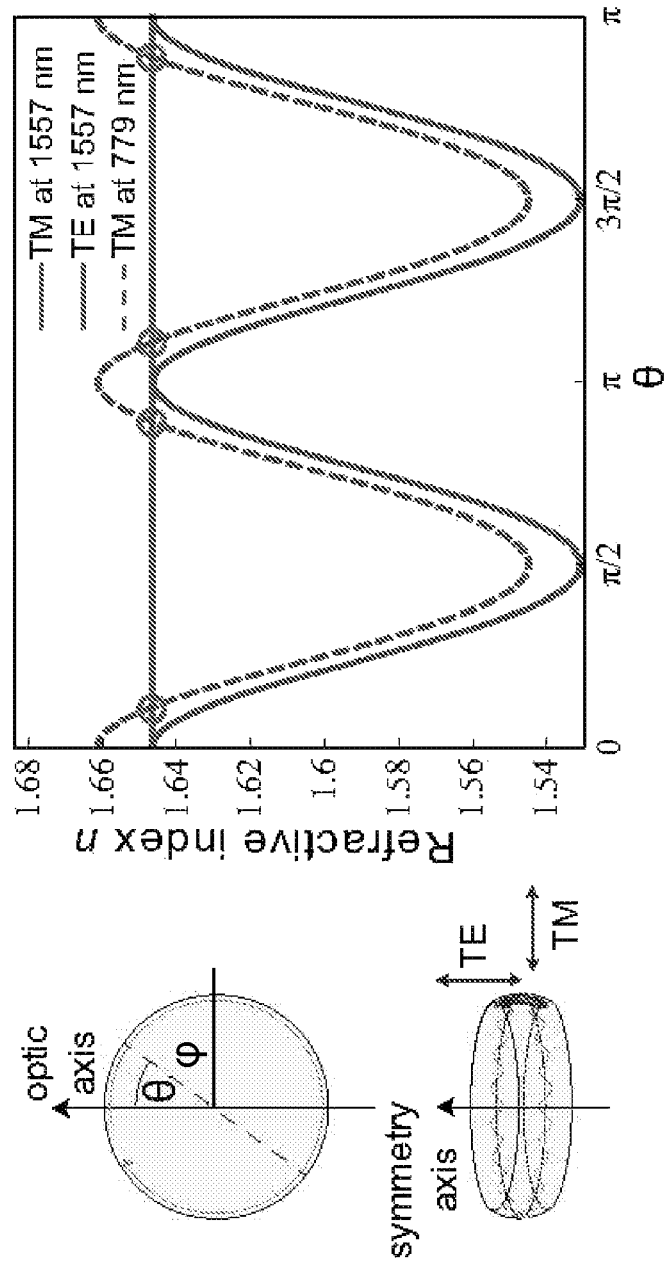
FIG. 3A is a plan diagram of an xy-cut BBO crystal disk resonator that illustrates the optic axis z lying in the plane of the disk, the relative angle $\theta$, and the angle $\phi = 90 - \theta$.
FIG. 3B is a perspective diagram of an xy-cut BBO crystal disk resonator that shows the TE and TM polarizations relative to an optical wave travelling in WGM.
FIG. 3C is a graph of refractive indices of WGMs along the disk circumference for TE and TM at a 1557 nm pump fundamental and its TM second harmonic. There are four regions (circled) where collinear birefringent phase matching is achieved, when the refractive indices are equal. Such phase matching occurs between the TE fundamental field at 1557 nm and its TM second harmonic at 779 nm.

The two orthogonally polarized modes can in general be characterized as TE modes with their polarization perpendicular to the disk plane and TM modes parallel to it as shown in FIG. 3A. The xy-cut breaks the typical rotation symmetry of a WGM resonator. The polarization of TE modes remains orthogonal to the optic axis as light travels; its refractive index is constant. In contrast, the refractive index of TM modes is expected to vary as the polarization rotates relative to the optic axis along the circumference of the disk. The refractive index of the TM modes can be calculated with the expression:

$$\frac{1}{n^2(\lambda, \theta)} = \frac{\cos^2\theta}{n_o(\lambda)^2} + \frac{\sin^2\theta}{n_e(\lambda)^2} \qquad (1)$$

where $n_o(\lambda)$ and $n_e(\lambda)$ are refractive indices of ordinary and extraordinary polarized rays respectively available from Sellmeier equations, and $\theta$ is the angle between the wave vector and the optic axis ($\theta=0°$ when the TM polarization is perpendicular to the optic axis). The indices evaluated for 1557 nm and its second harmonic are plotted in FIG. 3B. The refractive index of TM rays oscillates from the ordinary index value $n_o$ to the extraordinary index value $n_e$ while the refractive index of TE rays is a constant as expected. More significantly, while the phase mismatch between the TE pump field and TM second harmonic field oscillates, there are crossover points in each round trip where the phase between the TE fundamental and TM second harmonics are matched in the xy-cut BBO resonator.

Figure 4A:
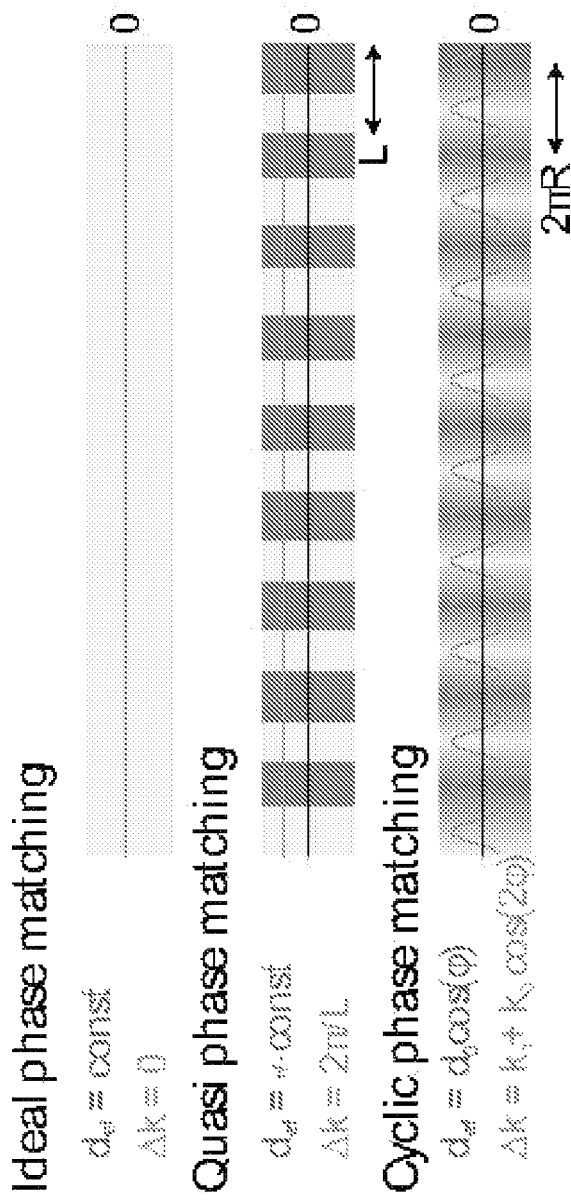
FIG. 4A is a diagram that illustrates various phase matching schemes (ideal phase matching, quasi phase matching and cyclic phase matching) in terms of the nonlinear coefficients $d_{eff}$ and the phase mismatch $\Delta k$.

The generation of second harmonic field is described in general by the equation:

$$\frac{dE_2}{dz} = \frac{2i\omega_2^2}{k_2 c^2} d_{eff} E_1^2 e^{i\int_0^z \Delta k\, dz} \qquad (2)$$

where $\Delta k = 2k_1 - k_2$ represents the phase difference between the fundamental wave vector $k_1 = 2\pi n_1/\lambda_1$ and that of the second harmonic field $k_2 = 2\pi n_2/\lambda_2$, with their corresponding wavelengths $\lambda_1 = 2\lambda_2$ and refractive indices $n_1$ and $n_2$. $\omega$, c and $d_{eff}$ represent the corresponding angular frequency, the speed of light, and the effective nonlinear coefficient respectively. The condition $\Delta k = 0$ represents perfect PM. In this case, the second harmonic field builds up constructively as the pump and the second harmonic copropagate along the nonlinear material. This ideal PM condition is illustrated in FIG. 4A. Alternatively when such an ideal condition cannot be met in a given crystal, one can artificially reverse the sign of the effective nonlinear coefficient periodically to accomplish QPM in ferroelectric materials, as illustrated in FIG. 4A. In this case, the second harmonic field can grow, though not as quickly as in the perfect phase matching case.

FIG. 4A is a diagram that illustrates various phase matching schemes (ideal phase matching, quasi phase matching and cyclic phase matching) in terms of the nonlinear coefficients $d_{eff}$ and the phase mismatch $\Delta k$. Light propagates in the horizontal direction. In the ideal phase matching condition, $d_{eff}$ is a constant while $\Delta k$ is uniformly zero, i.e. phase matched. In the periodic quasiphase match, the sign of $d_{eff}$ is altered with the periodicity such that the fundamental and second harmonic are always more or less in phase. In the cyclic semi-phase matching, both $d_{eff}$ and $\Delta k$ vary with discreet phase matched regions around the resonator that recurs with each round trip of the waves.

Figure 4B:
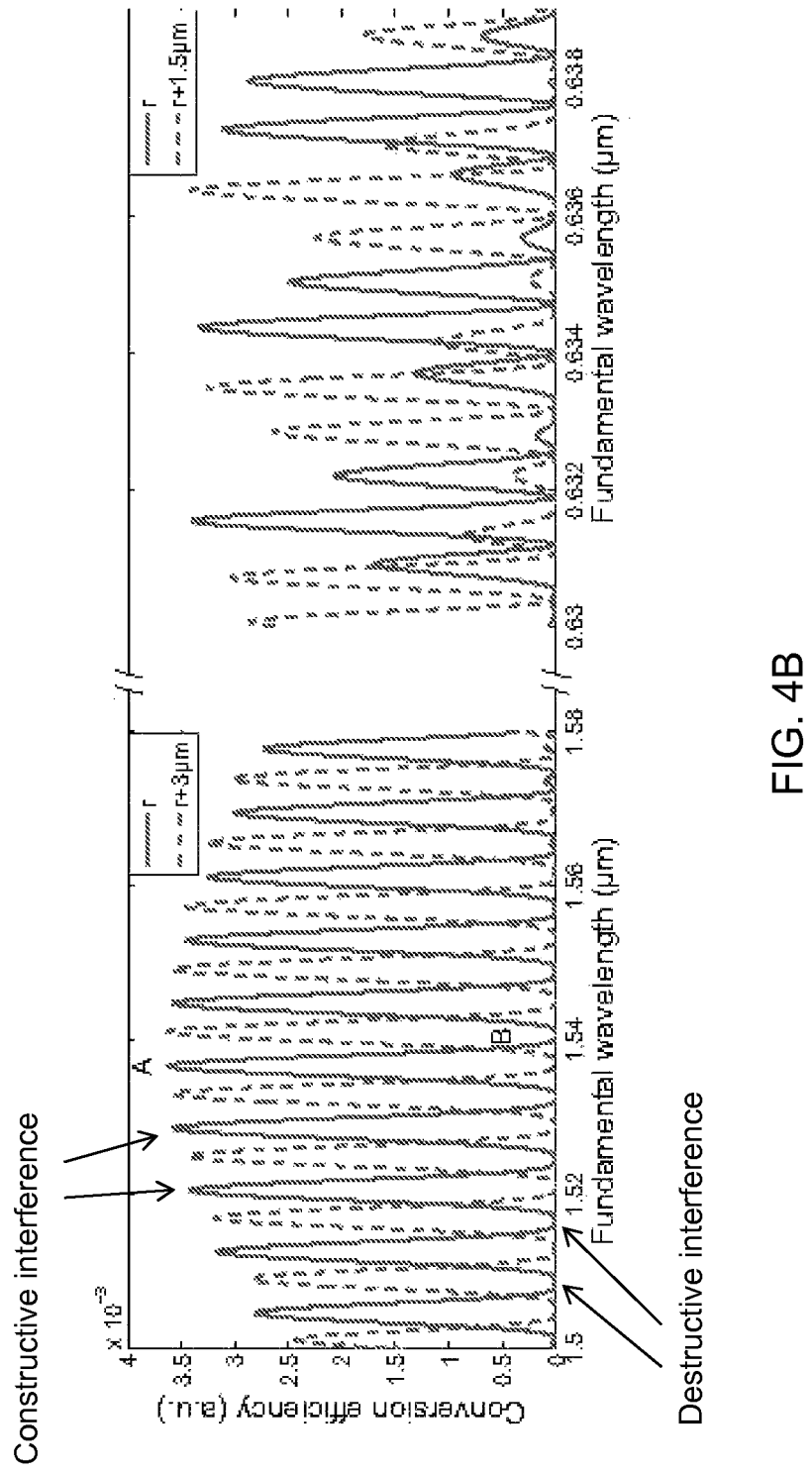
FIG. 4B is a graph that presents calculated conversion efficiencies in a single round trip for two wavelength regimes as a function of pump wavelength. The dashed curves show the tuning of the optimal conversion regions by changing the resonator radius r.

In the xy-cut WGM geometry both phase mismatch $\Delta k$ and the effective nonlinear coefficient $d_{eff}$ oscillate as a function of $\theta$. The $\theta$-dependent oscillation in general results in four phase matched regions and an overall favorable phase matching condition in each round trip. Additionally, the doubly resonant condition (for the pump and for the second harmonic) ensures the repeated phase matching and the growth of the second harmonic field in the high Q resonator. We call this cyclic phase matching (CPM) condition, referring the PM regions in parts of each round trip and the recurring process with circulating waves in the xy-cut resonator. This is illustrated in FIG. 4B.

To understand the phase matching process more quantitatively, we need to carry out the integration of Equation (2). We will make a further simplification by unfolding the circulating path in a resonator to a linear waveguide of a length equal to the effective path length of the resonator. This approximation works particularly well when considering the doubly resonant condition where the light field phases of both pump and second harmonic repeat exactly after one round trip. One thus needs only to evaluate the field gain of a single round trip to understand the PM for the harmonic conversion. This single path length is about 7 mm for the xy-cut crystal resonator used in our study. By numerically integrating equation (2) with an undepleted pump, we evaluated the relative conversion efficiencies for two fundamental wavelengths around 1557 nm and 634 nm. We found indeed that this model predicts phase matching over a wide pump wavelength range, with the short wavelength limit of 410 nm determined by the birefringence of BBO and the long wavelength limit of 2.6 μm due to the material absorption. The conversion efficiency however is modulated, so the optimal phase matching is achieved only at discreet wavelength regions. The optimal conversion frequencies can be tuned simply by changing the optical path length around the resonator. For example, by changing the dimension of the resonator by a mere 0.2%, one can shift a minimum conversion point to a maximum, as shown in FIG. 4B. Alternatively, optimal wavelengths can be found by coupling different WGMs exhibiting different effective resonator lengths. This shows that CPM is indeed applicable in a broad wavelength range.

Figures 5A, 5B, 5C, 5D:
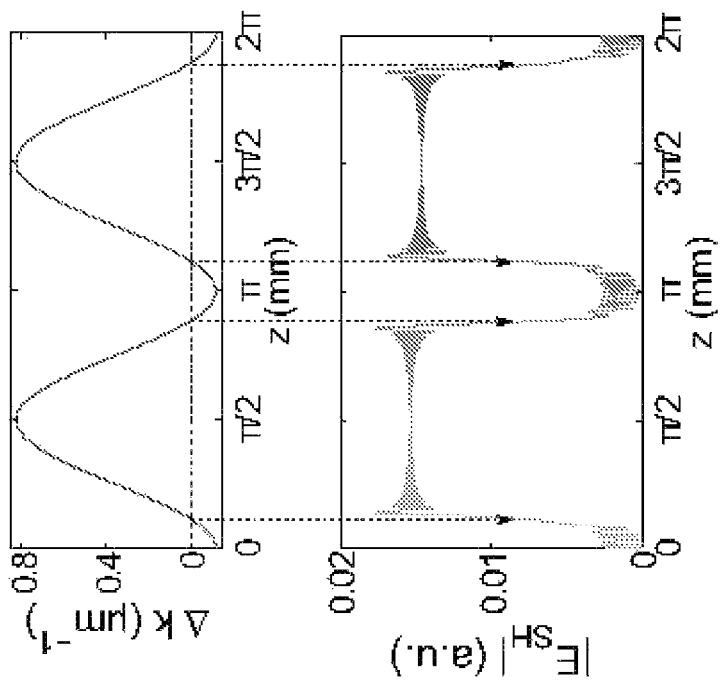
FIG. 5A is a plot of the calculated phase mismatch $\Delta k$ vs. the position 0 around a disk resonator for a maximum conversion case.
FIG. 5B is a plot of the electric field amplitude of the second harmonic signal vs. $\theta$ for a maximum conversion case.
FIG. 5C is a plot of the calculated phase mismatch $\Delta k$ vs. the position $\theta$ around a disk resonator for a minimum conversion case.
FIG. 5D is a plot of the electric field amplitude of the second harmonic signal vs. 0 for a minimum conversion case.

The phase evolution and the growth dynamics of the second harmonic field in the xy-cut resonator are of interest. We have plotted separately the calculated phase mismatch and the second harmonic amplitude as a function of the angle $\theta$ and the corresponding amplitude diagram in the complex plane in FIG. 5. The color variation of the amplitude plots represents the propagation along the angle $\theta$. The conditions in FIG. 5A and FIG. 5B correspond to maximal efficiencies and the conditions in FIG. 5C and FIG. 5D correspond to minimal conversion efficiencies as labeled in FIG. 4B. One can see that the second harmonic field strength oscillates rapidly with small amplitudes when the phase mismatch is large while it increases or decreases effectively when the phase mismatch disappears. In the complex plane, the second harmonic amplitude growth is trapped in a smaller spiral for a larger phase mismatch but spreads out quickly as the phase mismatch disappears. In general we have four short effective nonlinear coupling regions per round trip. Their locations determine either constructive or destructive interferences for second harmonic generation in these four regions. The separations among these four regions have two characteristic length scales (see FIG. 3C) which result in a convolution of a slow and a fast modulation in the conversion efficiency for different wavelengths. In FIG. 4B, this is most prominent for shorter wavelengths.

Phase matching in the short discrete regions is less efficient compared to the ideal and quasi phase matching. In a high Q resonator, this deficit is partly made up by the long effective path length and the coherent double resonance condition. In addition, the CPM scheme uses natural phase matching characteristics of the host material and does not require any additional material processing such as periodical poling. However these techniques may be combined to make CPM an even more flexible tool.

For experimental verification of the CPM for SHG, we fabricated an xy-cut BBO WGM resonator from a crystalline disk substrate with its edge polished into a spheroid shape of optical grade smoothnesss. The disk has a diameter of about 2.23 mm and a few hundred microns thickness. Though the optic axis induced unequal surface stiffness along the circumference, we were able to produce disks with measured Q factors on the order of $10^7$ from near infrared (1560 nm) up to UV (370 nm). The resonator is mounted in an apparatus illustrated in FIG. 6A. A tunable laser source at 1560 nm was first used as the fundamental pump source. A linear polarizer and a half-wave plate are used to control the input laser polarization. The TE polarized pump beam is then focused into a sapphire prism for evanescent excitation of WGMs in the BBO disk. The output beam from the prism is collimated with a second lens and sent through a dichroic mirror to separate the fundamental and second harmonic signals which are monitored simultaneously with detectors. A bandpass filter is placed in front of the second harmonic detector to further remove noise from the pump signal.

Figure 7A:
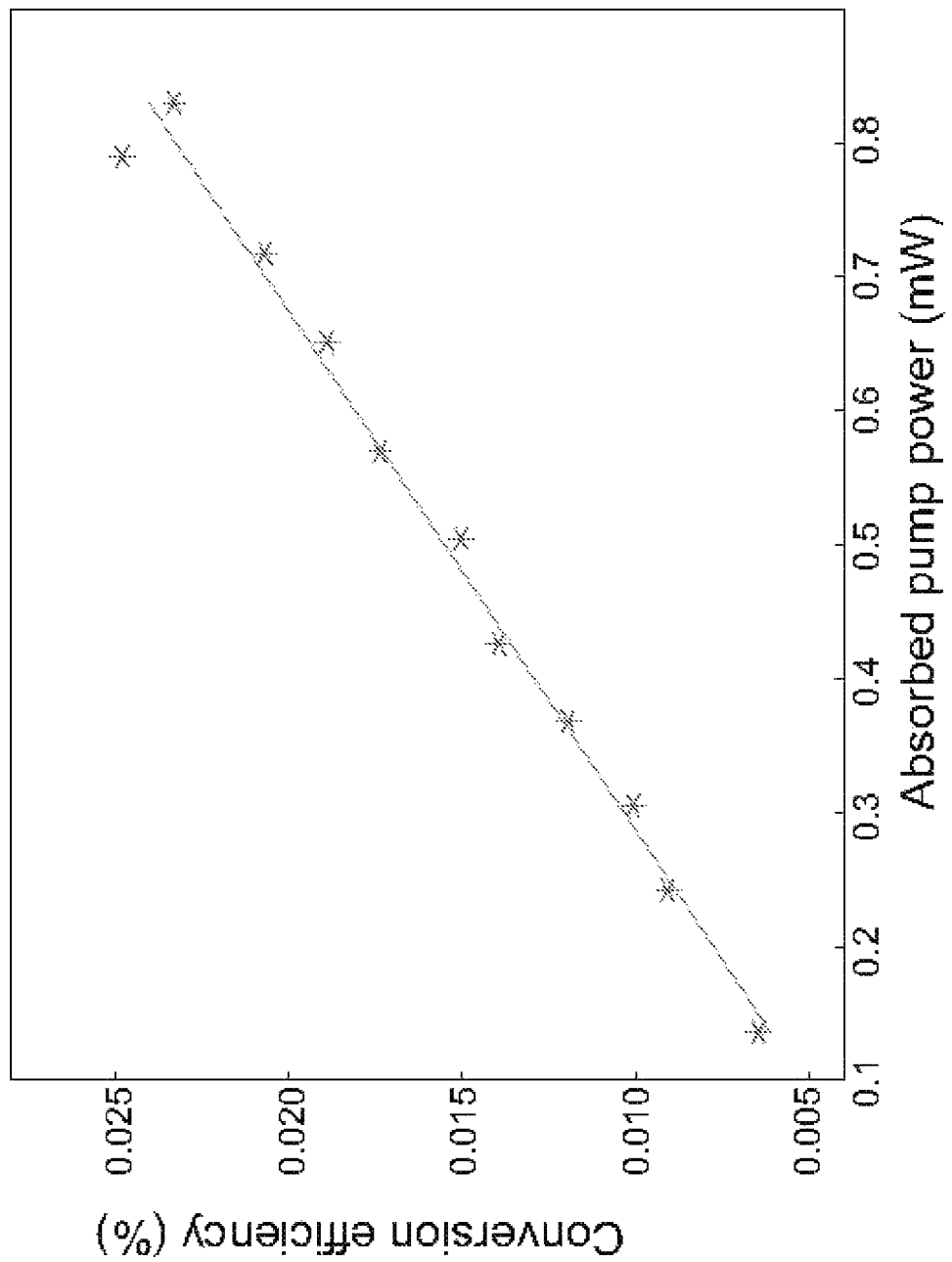
FIG. 7A is a graph of the second harmonic conversion efficiency versus the pump power at a wavelength of 1557 nm. The linear dependence confirms the second order nonlinear process for the second harmonic generation.
Figure 7B:
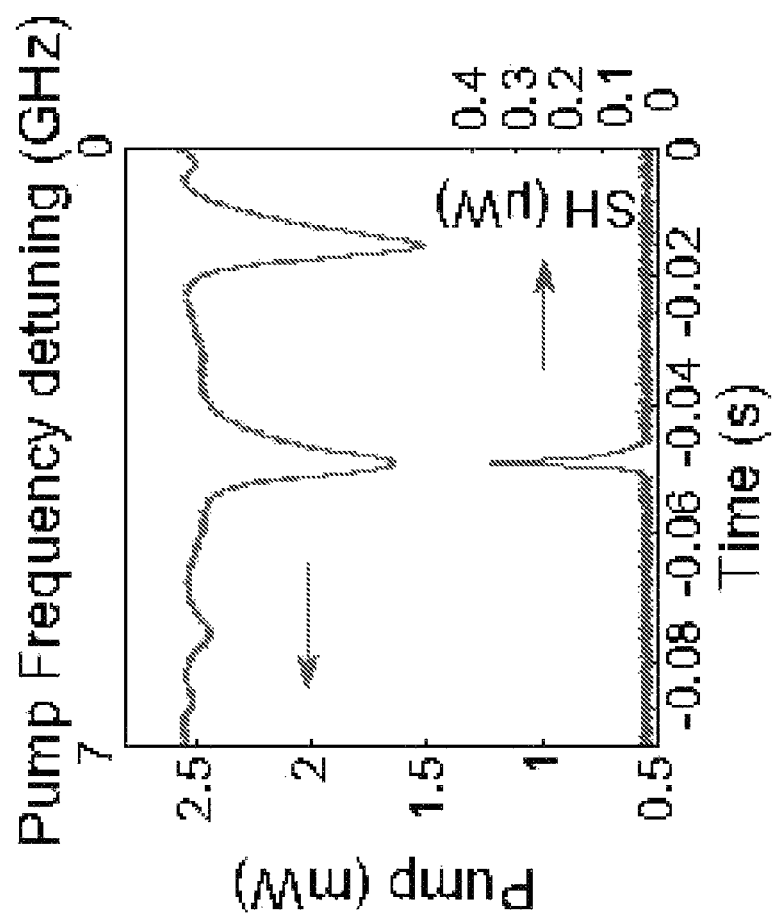
FIG. 7B is a graph of spectra obtained when scanning the pump laser frequency showing several whispering gallery modes at 1557 nm. One of the modes is phase matched with a second harmonic mode. The transmitted pump signal and the second harmonic signal as the pump laser frequency scanned across a second harmonic generation modes. The linewidth of the second harmonic appears narrower than the pump because of the nonlinear pump power dependence of the second harmonic.

The WGM resonator is pumped with a few milliwatts of power. The pump laser frequency is scanned over several WGMs and the output signals are detected simultaneously. FIG. 7B shows an example of spectra obtained when scanning the pump laser frequency across several TE WGMs at 1557 nm. The second harmonic signal appears when the pump laser is swept over one of the pump modes where the double resonance condition and the CPM condition are fulfilled. As the optimal coupling has typically smaller gap for shorter wavelengths, stronger second harmonic signals are usually obtained when the WGM at pump is over-coupled. The SHG has been further confirmed by the linear pump power dependence of the second harmonic conversion efficiency as shown in FIG. 7A. In obtaining this set of data, the pump was undercoupled with a larger gap for clearer off-resonance baseline. The in-coupled fundamental pump power is estimated by the height of the resonance dip in the pump transmission. We varied the incident pump power and kept the coupling gap unchanged during this measurement.

Figure 6B:
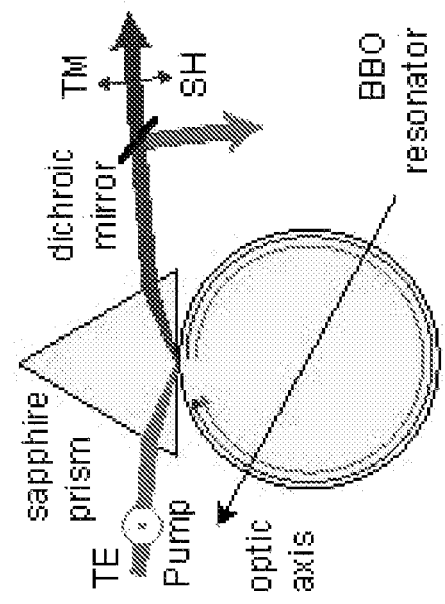
FIG. 6B is an image of BBO disk resonator mounted on a brass post in front of the coupling prism.
Figure 6A:
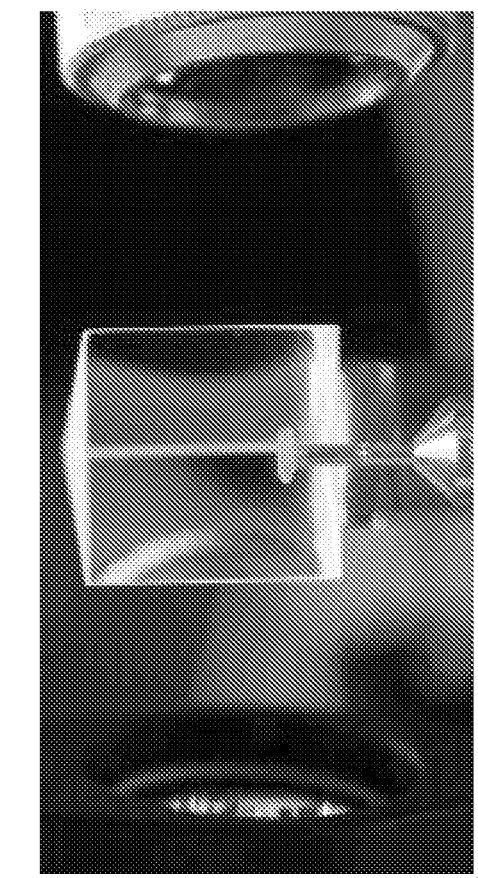
FIG. 6A is a schematic diagram of the apparatus showing the polarization orientations of the pump and the second harmonic fields. The wavelength separation is implemented with a dichroic mirror.
Figure 6E:
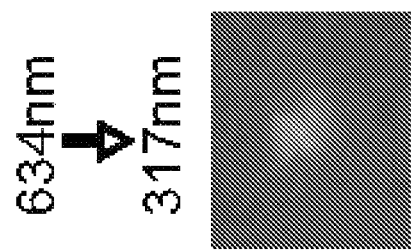
FIG. 6E is an image of the second harmonic beam profile generated using a 634 nm pump laser.
Figure 6D:
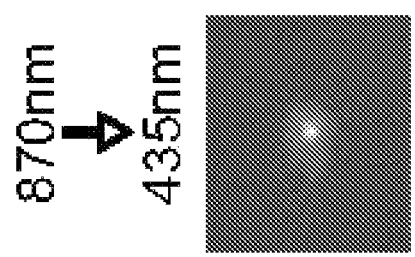
FIG. 6D is an image of the second harmonic beam profile generated using a 870 nm pump laser.
Figure 6C:
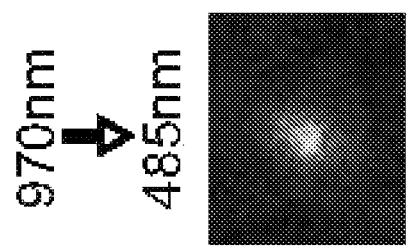
FIG. 6C is an image of the second harmonic beam profile generated using a 970 nm pump laser.

We also used cw lasers at 970 nm, 870 nm and 634 nm to pump the same BBO resonator. We observed comparable conversion efficiencies in all these cases. FIG. 6B shows the images of the second harmonic output beams observed on a paper card inserted behind the dichroic mirror or band pass filter. Violet and blue-green colors correspond to the second harmonic signal at 435 nm and 485 nm. Blue and red spots are related to luminescence from 317 nm on the paper card and the residual pump laser at 634 nm respectively. The spatial separation between blue and red is due to the dispersions in the WGMs in the resonator and the sapphire coupling prism which is used as an evanescent coupler. For clarity, we summarize the best conversion efficiencies obtained in the 2.23 mm diameter BBO resonator for all the wavelengths used in Table 2. Compared with a recently reported conversion efficiency of 0.038% in a 5 mm length BBO pumped by 5.7 W CW 532 nm laser or $6.7 \times 10^{-6}\%$ $mW^{-1}$, the results from the CPM SHG are three orders of magnitude higher. It should be noted that the observed efficiencies are affected by three main factors related to the WGM resonator: the Q factors of the pump and the harmonic modes, the spatial and spectral overlap factors between the WGMs at the pump and the harmonic frequency, and the overall CPM condition.

The observed SHG over one octave wavelength band in a single xy-cut crystal is consistent with the prediction of the CPM process. One of the key phenomena making the CPM possible is the existence of the TM mode with varying refractive index. We experimentally confirmed that the polarization of the outgoing second harmonic beam is along the expected TM direction, in the plane of the disk resonator. In fact, by rotating the disk and therefore the relative coupling point with respect to the optic axis, we observed the angular variation of the SHG output beam spot, as expected from the θ dependence of the refractive index of a TM WGM.

On the other hand, when we pumped with the same light but in the TM polarization direction in the same resonator, we did not observe any second harmonic signal. According to CPM, this is also expected because there exist no phase matching regions between a TM pump and TE second harmonic in a plot similar to FIG. 3B. This strongly supports the theory of CPM. To further demonstrate the critical role of the phase matching points, we investigated both a WGM resonator from z-cut BBO and one from x-cut quartz. In both cases, there are no phase matching regions found between TE pump and TM second harmonic. In both cases, we were unable to observe any second harmonic signals under similar conditions.

With a single resonator of xy-cut BBO, we were able to demonstrate SHG over more than one octave wavelength range from the near infrared, through the visible, and up to the ultraviolet wavelengths. It is expected that cyclic semi-phase matching can cover the entire birefringent phase matching range of the nonlinear crystal used. Choosing BBO as the birefringent material, we have also made the first observation of cw SHG in the UV regime in WGM resonators. The cyclic semi-phase matching paves the way for a broader array of nonlinear optics applications with WGM resonators for both cw and mode-locked lasers. Using new nonlinear crystals such as $KBe_2BO_3F_2$, it is expected that it will be possible to extend the SHG into the vacuum UV wavelength regime.

In further work, we have demonstrated conversion efficiencies in a BBO whispering gallery mode resonator are as high as 4.6% $(mW)^{-1}$. This conversion process is based on Type-I phase matching with continuously varying optical axis orientation in an xy-cut configuration of the resonator. In such a geometry the second harmonic whispering gallery mode experiences an oscillatory modulation of the refractive index. This enables broadband cyclic phase matching along the circumference of the disk resonator.

A whispering gallery mode resonator made from a homogeneous dielectric supports two orthogonally polarized mode families, the transverse electric (TE) and transverse magnetic (TM) modes as illustrated in FIG. 4A. To a good approximation, the spatial distribution of the electric field $\vec{u}(r,\partial,\phi)$ for a TM mode and analogously the distribution for the magnetic field for a TE mode are described in spherical coordinates by $$\vec{r} \cdot \vec{u}(r,\partial,\phi) = C_m^{q,l}(r,\phi) \cdot e^{im\phi}$$

with $C_m^{q,l}(r, \phi)$ describing the radial and polar field distribution and the radial and polar mode numbers q and l. Azimuthally, the field is described by a complex exponential, which reflects the rotational symmetry of the resonator. The three mode numbers are thereby related to the wavelength of the mode via the dispersion relation.

For phase-matching, momentum conservation in bulk material transforms to the conservations of angular momentum in WGM resonators, expressed via selection rules on the mode numbers of the modes involved. In particular, they require that the azimuthal mode number m has to be conserved.

An xy-cut geometry resonator supports two modes families in general, with TE modes now experiencing the ordinary refractive index. The TM modes, however, experience an oscillation in the refractive index $n(\phi)$ along the circumference between the ordinary and extraordinary value of the crystal. This situation is depicted in FIG. 4B for BBO at 1557 nm. Considering possible Type-I second harmonic generation in BBO, the index variation of a TM mode at 779 nm is also presented. We find four regions where the indices of a TE polarized pump mode at 1557 nm and its harmonic TM mode are equal. These are four discreet regions where phase matching occurs. Since the circulating fields in the resonator repeat these phase matching every round trip, we refer to this birefringent phase matching in a resonator as cyclic phase matching (CPM). From a different perspective, as the xy-cut geometry still exhibits a periodicity in the azimuthal or $\phi$ direction, the electric field of both mode families can still be expressed in the complex valued exponential functions with adapted polar and radial functions. To account for the oscillatory behavior of the refractive index of TM modes, the electric field of TM modes has to be described by a superposition of complex exponential functions with different azimuthal mode numbers. Thus, there is a variety of azimuthal modes available for phase matching, increasing the bandwidth of wavelength for phase matching.

The conversion profile in FIG. 4A is determined by the refractive indices and the resonator size. The tuning of the conversion maxima and minima by the resonator size can be seen in FIG. 4A for a radius variation of 0.2%. The refractive index can also be changed by the thermo-refractive and electro-optic effect. It can be changed by choosing different resonator modes thus using the modal dispersion at the same time.

Four tunable laser sources at 634 nm, 870 nm, 974 nm and 1557 nm are used as fundamental pump sources. The TE polarized pump beam is focused onto the backside of the prism for evanescently coupling to the WGM resonators. The output beam from the prism is collimated again with the pump and harmonic fields spectrally separated using a dichroic mirror. A bandpass filter is placed in front of the second harmonic detector to further reduce the pump light. Both fields are monitored simultaneously with two detectors.

The linewidths of the resonances of the BBO WGM resonator were measured at all wavelengths by scanning the laser frequency and observing resonances in the pump intensity. From these linewidth measurements we inferred the Q factors at all pump wavelengths. We found the Q factors on the order of $10^7$ for both TE and TM modes, which confirms the existence of whispering gallery modes also in the xy-cut geometry. In addition, we measured carefully the free spectral range of the TE and TM WGMs at 1557 nm. We find the average refractive index of (1.59±0.01) and (1.65±0.01) respectively. These values match with the average value of 1.587 for the TE whispering gallery mode and the ordinary index of refraction of 1.647 for the TM mode. Experimentally, we also observed that the required TM excitation angle at the prism changed dramatically when changing the disk coupling position along its circumference, consistent with a spatially varying refractive index of TM modes.

Figure 8A:
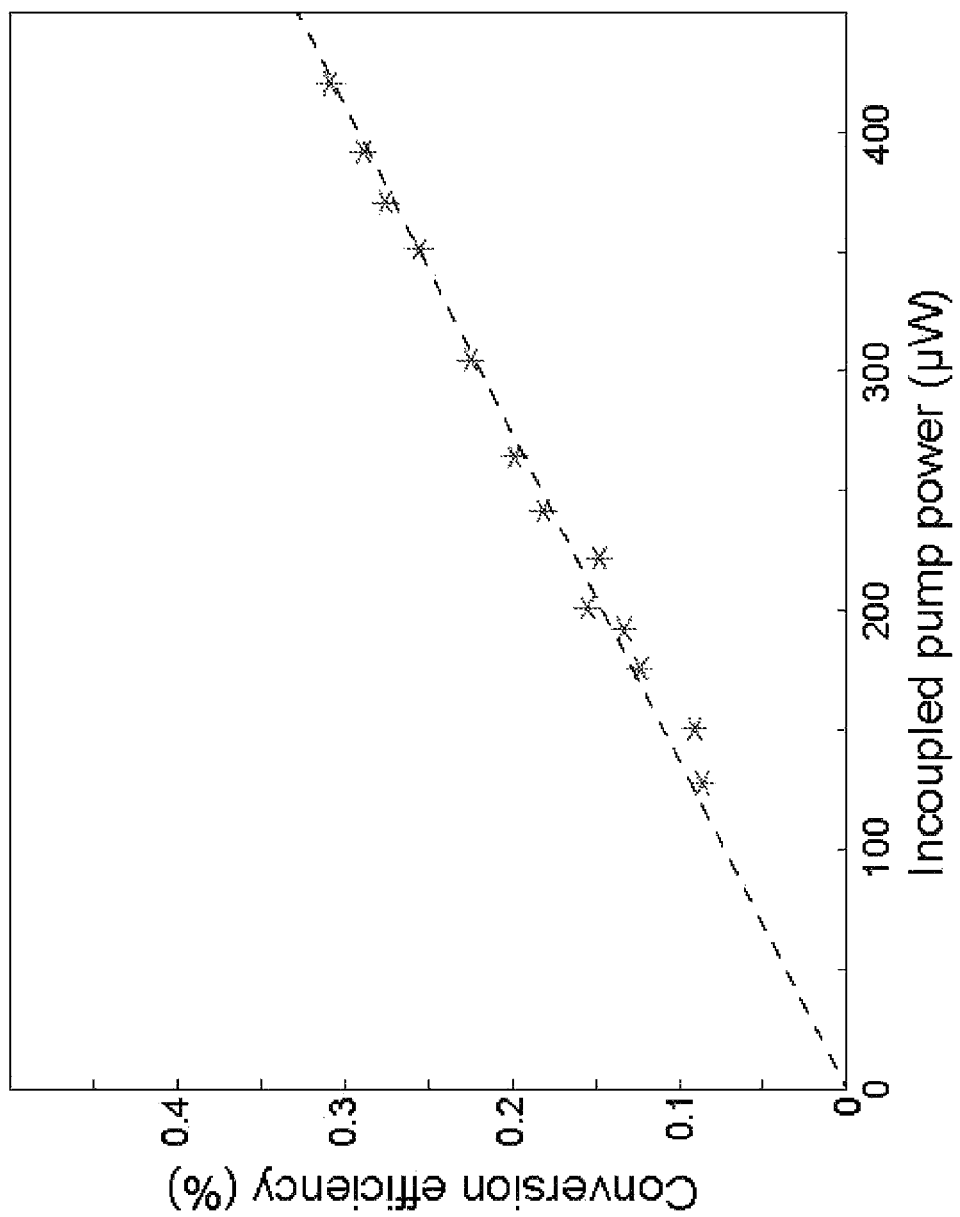
FIG. 8A is a graph of the conversion efficiency of the harmonic field versus pump power for a pump wavelength of 634 nm, showing a linear dependence.
Figure 8B:
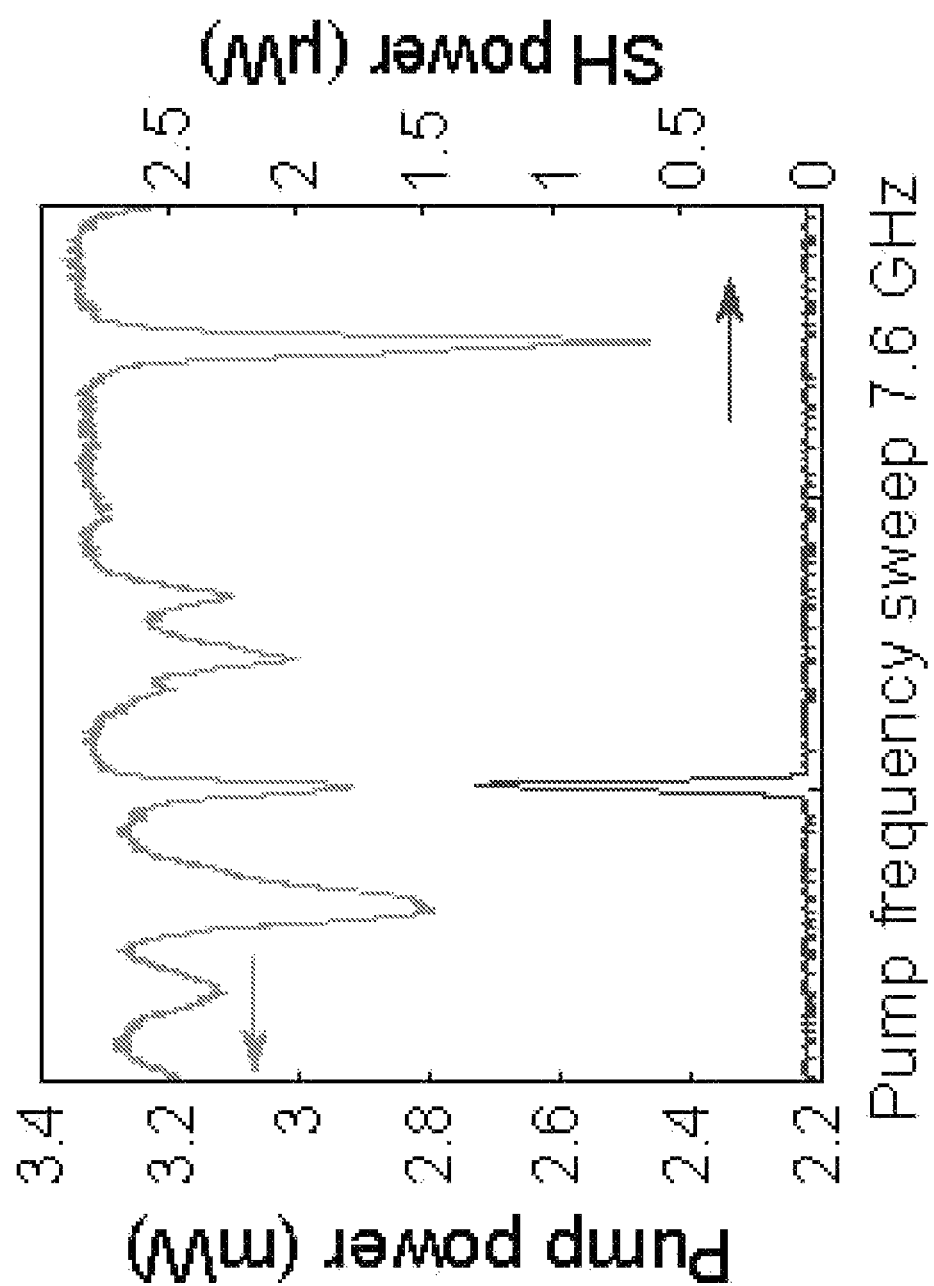
FIG. 8B is a graph of spectra obtained Frequency sweep of the pump field, showing several whispering gallery modes at 634 nm. One of the modes is phase matched with a second harmonic mode.

For SHG, we pumped the WGM resonator with a few milliwatts of power consecutively with the four mentioned laser sources while over-coupled the resonator with a fixed gap distance between the WGM resonator and prism. The pump laser frequency was scanned over several modes to find phase matching. FIG. 8B shows an example of such a frequency scan at 634 nm. When CPM was satisfied at the doubly resonant condition, a harmonic signal was observed. We confirm the SHG linearity of the conversion efficiency with the incoupled pump power as shown in FIG. 8A. The pump power was corrected for the incoupling contrast, giving the incoupled pump power. We observed second harmonic generation for all four pump laser sources in the same BBO resonator. Thermal tuning was used to optimize the conversion efficiency at each wavelength. Compared with previously reported cavity enhanced SHG systems at UV wavelengths, the demonstrated overall efficiencies of CPM are comparable and higher. If one compares the compact and broadband WGM resonator device to a comparably small single pass doubling arrangement, the improvement factor is of several orders of magnitude.

TABLE 2

SHG conversion efficiency for different pump wavelengths

| Pump wavelength (nm) | Pump power (mW) | Pump Q-factor ($10^6$) | Second harmonic power (μW) | Conversion efficiency (%/mW) |
|---|---|---|---|---|
| 1557 | 1.1 | 3 | 0.76 | 0.063 |
| 974 | 0.25 | 7 | 2.9 | 4.6 |
| 870 | 0.87 | 10 | 13.5 | 1.8 |
| 634 | 0.42 | 4 | 1.3 | 0.74 |

Definitions

Unless otherwise explicitly recited herein, any reference to an electronic signal or an electromagnetic signal (or their equivalents) is to be understood as referring to a non-transitory electronic signal or a non-transitory electromagnetic signal.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An optical resonator, comprising:
a birefringent crystal having an optical axis, said birefringent crystal cut so that said optical axis is disposed at an angle different from 0 degrees relative to a direction perpendicular to a cut face of said birefringent crystal, said birefringent crystal configured to operate in a whispering gallery mode of optical propagation, said birefringent crystal configured to receive an input electromagnetic signal having a first frequency $f_1$ and configured to provide in response to said input electromagnetic signal an output electromagnetic signal having a second frequency $f_2$, said first frequency and said second frequency being related according to the relation $$f_2 = N \times f_1$$

where N is an integer greater than 1.

2. The optical resonator of claim 1, wherein said birefringent crystal is beta barium borate.

3. The optical resonator of claim 1, wherein said optical axis is disposed at an angle of 90 degrees relative to a direction perpendicular to a cut face of said birefringent crystal.

4. The optical resonator of claim 1, wherein said input electromagnetic signal is a TE mode electromagnetic signal.

5. The optical resonator of claim 1, wherein said output electromagnetic signal is a TM mode electromagnetic signal.

6. The optical resonator of claim 1, wherein said integer N=2.

7. The optical resonator of claim 1, wherein said input electromagnetic signal is an infrared signal.

8. The optical resonator of claim 1, wherein said input electromagnetic signal is a visible signal.

9. The optical resonator of claim 1, wherein said input electromagnetic signal is an ultraviolet signal.

10. The optical resonator of claim 1, further comprising a structure evanescently coupled to said birefringent crystal, said structure configured to couple said input electromagnetic signal into said birefringent crystal, and said structure configured to couple said output electromagnetic signal out of said birefringent crystal.

11. The optical resonator of claim 10, wherein said structure evanescently coupled to said birefringent crystal is a prism.

12. A method of generating a harmonic of an electromagnetic signal, comprising the steps of:
providing a birefringent crystal having an optical axis, said birefringent crystal cut so that said optical axis is disposed at an angle different from 0 degrees relative to a direction perpendicular to a cut face of said birefringent crystal;
applying an input electromagnetic signal having a first frequency $f_1$ to said birefringent crystal;
operating said birefringent crystal in a whispering gallery mode of optical propagation; and
recovering from said birefringent crystal an output electromagnetic signal having a second frequency $f_2$, said first frequency and said second frequency being related according to the relation $$f_2 = N \times f_1$$

where N is an integer greater than 1.

13. The method of generating a harmonic of an electromagnetic signal of claim 12, wherein said optical axis is disposed at an angle of 90 degrees relative to a direction perpendicular to a cut face of said birefringent crystal.

14. The method of generating a harmonic of an electromagnetic signal of claim 12, wherein said input electromagnetic signal is a TE mode electromagnetic signal.

15. The method of generating a harmonic of an electromagnetic signal of claim 12, wherein said output electromagnetic signal is a TM mode electromagnetic signal.

16. The method of generating a harmonic of an electromagnetic signal of claim 12, wherein said integer N=2.

17. The method of generating a harmonic of an electromagnetic signal of claim 12, wherein said input electromagnetic signal is an infrared signal.

18. The method of generating a harmonic of an electromagnetic signal of claim 12, wherein said input electromagnetic signal is a visible signal.

19. The method of generating a harmonic of an electromagnetic signal of claim 12, wherein said input electromagnetic signal is an ultraviolet signal.

20. The method of generating a harmonic of an electromagnetic signal of claim 12, wherein at least one of said input electromagnetic signal and said output electromagnetic signal is evanescently coupled to said birefringent crystal by way of a prism.

* * * * *